Sept. 10, 1963     H. I. CHESLER     3,103,561

ACCELERATOR PEDAL SIGNAL SYSTEM

Filed Sept. 29, 1961     2 Sheets-Sheet 1

INVENTOR.
HOWARD I. CHESLER
BY
*Sanford Schnurmacher*
ATTORNEY.

Sept. 10, 1963 H. I. CHESLER 3,103,561
ACCELERATOR PEDAL SIGNAL SYSTEM
Filed Sept. 29, 1961 2 Sheets-Sheet 2

INVENTOR.
HOWARD I. CHESLER
BY
ATTORNEY.

United States Patent Office 3,103,561
Patented Sept. 10, 1963

3,103,561
ACCELERATOR PEDAL SIGNAL SYSTEM
Howard I. Chesler, 2596 Milford Road,
University Heights, Ohio
Filed Sept. 29, 1961, Ser. No. 141,812
1 Claim. (Cl. 200—61.89)

The present invention relates to a signaling system for automotive vehicles, and more particularly to such a system which is under the control of the accelerator mechanism to give a danger signal when the accelerator pedal is in its inactive position.

Conducive to a better understanding of the invention, it may be well to point out that the modern automobile is customarily equipped with a stop light, universally red in color. This stop light is operated upon depression of the brake pedal. Therefore, this signal is one displayed following application of the brakes and is universally recognized by a following driver as indicating that the car ahead is about to slow down or stop.

However, another condition often arises that concerns the safety of operation upon highways, particularly in night driving. One vehicle may be following another vehicle. The leading vehicle driver may, for some reason or other, slacken his speed, by releasing the accelerator pedal, without the brakes being applied. The driver of the following vehicle would have no knowledge of that fact, particularly when the leading vehicle is some little distance ahead of the following vehicle. This reduction in speed would normally occur when the driver of the leading vehicle lifts his foot to allow the throttle foot pedal to return to its normal inactive position.

My invention is designed to signal such lowering of speed by activating the vehicle's red stop-light, which all drivers are conditioned to watch and react to at once.

Again, when the intention of the leading driver is to come to a full stop, and not merely to slow down, several seconds usually elapse between the time the driver lifts his foot from the accelerator pedal, moves it over into alignment with the brake pedal and finally depresses the brake pedal enough to activate the braking system.

The primary object of my invention, therefore, is to provide a throttle repsonsive switch that will activate the stop light of an automobile the instant the driver releases the accelerator pedal either to coast or preparatory to placing his foot on the brake pedal, thereby giving the driver of a following vehicle the advantage of information of things about to happen, not ordinarily available to a following driver.

Another object is to provide a signal device of the type stated that is inoperative when the ignition switch is turned off and uses no current most of the time the automobile is in operation, thereby avoiding battery drain. A motorist following an automobile so equipped will observe no signal until the accelerator pedal in the equipped automobile is released. There is no signal as long as the accelerator pedal is in its depressed operative position and therefore no drain on the battery.

A further object is to provide an improved signal light system for a motor vehicle that a simple and rugged in construction and foolproof in operation, which may be inexpensively manufactured and which may be quickly and easily installed as original equipment, or as an accessory to a motor vehicle without alteration in the vehicle's structure or disturbance of its electrical system.

These and other objects of the invention will become apparent from a reading of the following specification and claim, together with the accompanying drawing, wherein like parts are referred to and indicated by like reference numerals and wherein:

Figures 1, 2:
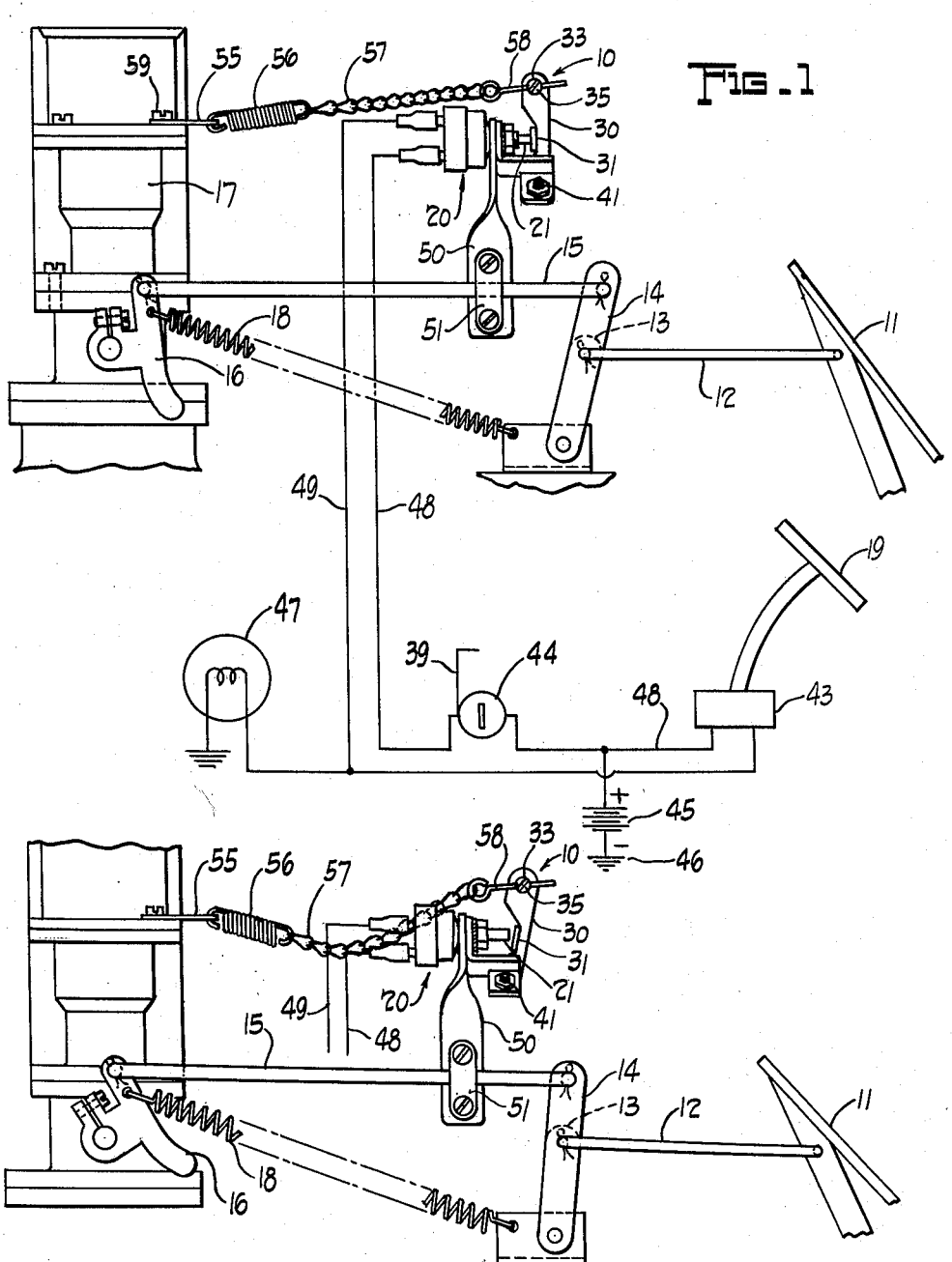
FIGURE 1 is a diagrammatic representation of the invention as applied to an automobile, showing the accelerator pedal in its in-operative position.
FIGURE 2 is a view similar to that of FIGURE 1, but showing the accelerator pedal in its depressed or operative position.
Figure 3:
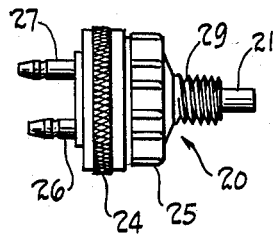
FIGURE 3 is a side elevation of the accelerator pedal position indicating control switch.

Referring more particularly to the drawing, there is seen in FIGURES 1 and 2 the accelerator pedal signal control unit that is the subject of this invention, broadly indicated by reference numeral 10, as it appears in a typical application mounted on the carburetor throttle control linkage rod 15 which connects the accelerator pedal 11 to the throttle valve rocker arm 16 of the carburetor 17. The accelerator pedal 11 is connected to the carburator throttle conrtol arm 16 through the usual linkage rods 12 and 15 and bell crank arms 13—14. The coil spring 18 is engaged with the valve arm 16 and acts to normally bias and hold the accelerator pedal 11 through the linkage rods 12 and 15 in its raised, inoperative position, wherein the carburetor throttle valve is in its closed position.

The signal control unit 10 comprises a mounting bracket 50 which is anchored on the accelerator pedal link 15 by means of a strap 51 which is positioned across the rod 15 and held in place by bolts 52. The bracket has an upstanding finger 53 at right angles to the rod 15, when mounted thereon, as seen in FIGURES 1 and 2.

The finger 53 has a mounting hole 54 therethrough, adapted to receive the threaded nipple 29 of the master switch 20. The switch 20 has a dielectric body portion 28, held between a closing shell 25 and a base ring 24. The shell 25 has a tubular mounting nipple 22 through which the switch plunger 21 is slidably mounted. A flexible switch leaf 22 is mounted within the shell in permanent electrical contact with terminal 26. A second terminal 27 is spaced from the first terminal 26 and is adapted to be contacted by the free end of the switch leaf 22 when the head 60 of plunger 21 is pressed thereagainst.

The switch leaf 22 is so constructed that it is normally self-biased away from the contact 27. In addition, a helical spring 23 nested in the body 28 acts to normally press against the underside of switch leaf 22 to reinforce its bias away from the contact terminal 27.

Reference numeral 40 indicates a mounting support, or platform, for the plunger depressor lever arm 30 which is pivotally mounted thereon through a pivot screw or pin 41.

The support 40 has bore 42 therethrough, through which the nipple 29 and its associated plunger 21 extend when the support is pushed up against the bracket finger 53.

The lever arm 30 has a laterally extending pressure plate 31 which is aligned with and engageable with the flat, free end of the plunger 21.

The arm 30 also has a bore 32 in the upper end thereof. A bushing 33 is journaled in the bore 32. The bushing 33 has a bearing head 36 which seats against the flat face of the arm 30. The bushing 33 has a cross-bore 34 spaced from the head 36 and an internally threaded axial bore which intersects the cross-bore 34.

The switch unit 20 is mounted upon the support bracket 50 by passing its nipple 29 through the bracket finger bore 54. The lever arm support 40 is then mounted on the nipple 29 through its mounting hole 42 and positioned against the bracket finger 53.

A lock washer 37 and nut 38 are then slipped onto the threaded end of the nipple and drawn up tight to secure the switch 20, bracket 50, and operating lever 30 into a single unit. When so assembled, the lever arm 30 is pivotable in a vertical plane so that its pressure plate 31 can be moved toward or away from the end of the plunger 21. The lever 30 is loosely fitted so that it can move entirely out of contact with the end of the push button. When so mounted on the switch nipple 29, the bracket 40 may be rotated thereon and locked in any desired position, thus making it possible to lock the lever arm 30 in adjusted angular positions relative to the vertical, as indicated by reference numerals 30a or 30b in FIGURE 4. At the same time the lever arm pressure plate 31 is maintained centered on and aligned with the free end of the switch plunger 21.

The so-assembled switch unit 10 is then mounted on the carburetor throttle link rod 15 with its plunger 21 faced away from the carburetor and toward the accelerator pedal 11, as seen in FIGURES 1 and 2. An activating chain 57 is anchored one end through coil spring 56 to carburetor 17 through a lug 55 and bolt 59. The other end of the chain 57 is connected to the lever arm bushing 33 through a pin 58, which extends through the bushing cross-bore 34 and is locked in place by set screw 35.

The length of the chain 57 is such that when the accelerator pedal 11 is in its raised, or in-operative position, as seen in FIGURE 1, the spring 56 will draw the chain taut, thereby pulling the lever arm 30 toward the switch plunger 21 and bringing its pressure plate 31 into pressed engagement thereagainst so that the head 60 of plunger 21 moves the switch leaf 22 into contact with terminal 27, thereby completing the circuit of the stop light 47 from the battery 45, the positive cable 48, the ignition switch 44, the contacts 26 and 27 of the switch 20, the cable 49 to the bulb 47 and thence through the grounded frame 46, back to the negative side of battery 45.

It will be noted that the stop light switch 43 of the brake pedal 19 is effected and acts independently of the accelerated pedal switch system 20.

Reference numeral 39 indicates the usual cable to the ignition coil from the ignition switch 44. Since the accelerator switch 20 is in series with the ignition switch 44, the accelerator signal system is only operative when the ignition is on, and no current is used when the motor is turned off. Thus, when the motor is running with the accelerator 11 in its idling position, the red stop light 47 remains illuminated.

When the accelerator pedal 11 is depressed to its operative position, as seen in FIGURE 2, the link rod 15 is moved toward the carburetor 17 to open its throttle. At the same time, the control unit 10 mounted on link 15 is also moved toward the carburetor. This shortens the distance between the lever arm bushing 33 and the carburetor anchor clip 55. The chain 57 then sags and relaxes, and no longer holds the pressure plate 31 of lever arm 30 against the switch plunger 21. The spring 23 of the switch 20 moves the switch leaf away from terminal 27 to break the circuit to the signal light 47.

Thus the signal light 47 circuit is broken as long as the accelerator 11 is depressed to feed fuel to the motor, but is instantly re-established to activate the signal light 47 as soon as the pedal 11 is released and returns to its non-operative position wherein the fuel supply valve is closed.

It will be evident that a following driver will aways know the instant the driver of the leading car has raised his foot from the accelerator pedal, either to slow down or to stop. Furthermore, since the same signal light 47 is used for indicating the position of the accelerator and brake pedals 11 and 19, respectively, the following driver's attention is not divided as is the case where several signal lights are used, thus further adding to the reliability and safety of my signal system.

While the lever chain 57 is illustrated as being anchored to the carburetor 17, it may be in fact anchored to any stationary structure on the car that is positioned ahead of the line of travel of the accelerator pedal link 15.

Figure 4:
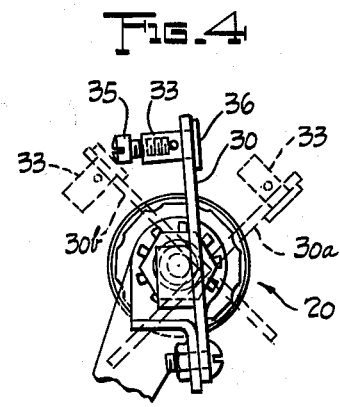
FIGURE 4 is a right end view of the switch showing its mounting bracket and activating lever in alternate radial positions.
Figure 5:
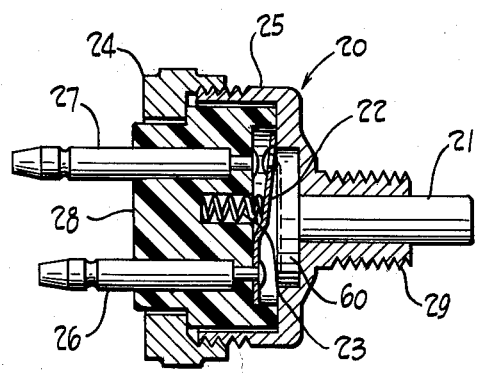
FIGURE 5 is a cross-sectional view of the switch taken along the line and in the direction of the arrows 5—5 of FIGURE 3.
Figure 6:
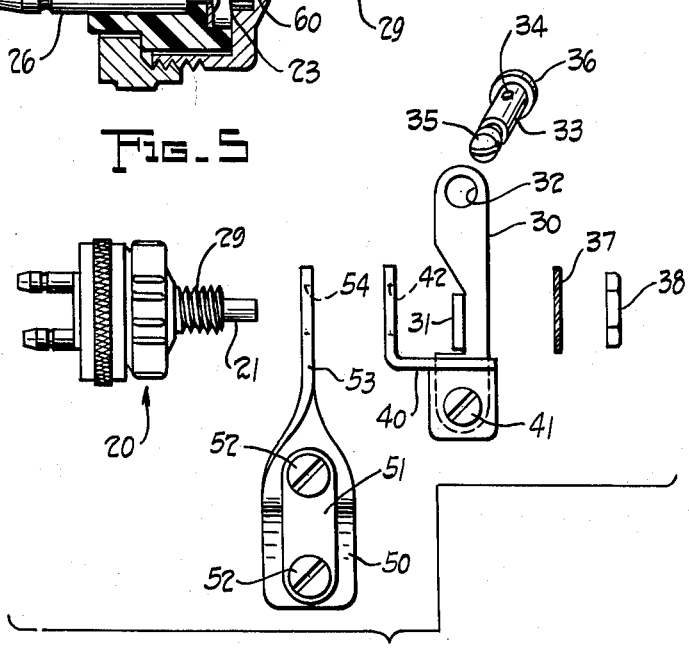
FIGURE 6 is an exploded view of the control switch and its associated mounting and activating components.

The lever arm 30 can be swiveled around the switch plunger 21, as seen most clearly in FIGURE 4, so that the chain 57 may be anchored to objects not directly in line with the link rod 15. Furthermore, the main supporting bracket 50 may be swiveled to adjusted radial positions relative to the axis of the link rod 15 to further facilitate mounting of the unit 10 in line with an off-center anchorage for the chain 57.

Again, with my device no change in the automobile's electrical circuit is required. As can be seen by referring to FIGURE 1, the control switch 20 is connected in series with the ignition switch 44 and the regular stop-light bulb 47, which points are easily available to the installing mechanic.

I claim:

A control device for use in an electrically operated accelerator-pedal position indicator system for automobiles having a carburetor throttle rod actuated by said pedal, comprising in combination, an elongated sheet metal bracket member twisted proximate its midsection to define a dependent flat base portion and an upstanding flat finger portion positioned crosswise of the base portion and having a bore therethrough; clamp means mounted on the base and engaged with the throttle rod to anchor the bracket on the throttle rod with the finger bore aligned with the line of travel thereof; a normally closed electric switch, of the type having a spring biased two position operating plunger extending through an externally threaded nipple, mounted on the bracket finger with its nipple extended through the bore thereof; an L-shaped platform member, having a base portion and an upstanding mounting wall having a bore therethrough, mounted on the switch nipple, against the bracket finger, with the switch nipple and plunger extending through its mounting wall bore; a nut threadedly engaged with the switch nipple and adapted to be tightened against the platform mounting wall to secure same in adjusted positions on the neck against the bracket finger; a plunger actuating arm pivotally mounted, at its lower end, on the platform base and pivotable against and away from the switch plunger; a flexible cable connected at one end to the upper end of the actuating arm and at the other end to the carburetor body ahead of the line of travel of the throttle rod; the length of the cable being such that it is taut, when the bracket and its supporting throttle rod are in a first position, and slack, when the bracket and its supporting throttle rod are in a second position; the actuating arm being pivoted against the plunger, to depress same, when the cable is taut, and free to pivot away from the plunger, when the cable is in its slack condition.

References Cited in the file of this patent
UNITED STATES PATENTS

| Re. 23,719 | Coombs | Oct. 6, 1953 |
| 2,918,652 | Epstein | Dec. 22, 1959 |